(12) United States Patent  (10) Patent No.: US 8,113,497 B2
Kellerson  (45) Date of Patent: Feb. 14, 2012

(54) CLAMPING FIXTURE WITH ADJUSTABLE ASSEMBLIES

(75) Inventor: Kenneth W. Kellerson, Caledonia, NY (US)

(73) Assignee: Kell Tech, Inc., Rochester, NY (US)

( * ) Notice: Subject to any disclaimer, the term of this patent is extended or adjusted under 35 U.S.C. 154(b) by 1190 days.

(21) Appl. No.: 11/746,472

(22) Filed: May 9, 2007

(65) Prior Publication Data

US 2008/0277852 A1 Nov. 13, 2008

(51) Int. Cl.
*B25B 1/20* (2006.01)
(52) U.S. Cl. .............................. 269/45; 269/71; 269/95
(58) Field of Classification Search ................... 269/45, 269/71, 73, 95, 43
See application file for complete search history.

(56) References Cited

U.S. PATENT DOCUMENTS

| | | | | |
|---|---|---|---|---|
| 5,019,129 | A * | 5/1991 | Johanson | 269/71 |
| 5,689,864 | A * | 11/1997 | White | 24/514 |
| 5,769,561 | A | 6/1998 | Pettersson | |
| 6,336,767 | B1 | 1/2002 | Nordquist et al. | |
| 6,536,754 | B2 * | 3/2003 | Nordquist | 269/60 |
| 6,609,851 | B2 | 8/2003 | Nordquist et al. | |
| 6,623,015 | B2 | 9/2003 | Schill et al. | |
| 6,811,150 | B2 | 11/2004 | Nordquist et al. | |
| 6,860,475 | B2 * | 3/2005 | Wong | 269/41 |
| 2008/0277852 | A1 * | 11/2008 | Kellerson | 269/60 |

* cited by examiner

*Primary Examiner* — Lee D Wilson

(74) *Attorney, Agent, or Firm* — Stephen B. Salai, Esq.; Jodi A. Reynolds, Esq.; Harter Secrest & Emery LLP

(57) ABSTRACT

The present invention includes a fixture for securing a work piece to a support surface at a machining workstation comprising a base attachable to the support surface and having at least one undercut edge, and, a work piece holder engaging the at least one undercut edge of the base, spaced apart from the support surface, and having moveable work piece attaching jaws.

17 Claims, 7 Drawing Sheets

CLAMPING FIXTURE WITH ADJUSTABLE ASSEMBLIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

None.

TECHNICAL FIELD

This invention relates generally to fixtures for a supporting surface of a machining workstation, and more specifically to a clamping fixture for a wire E.D.M. (Electrical Discharge Machine), wherein the fixture includes a work piece holder coupled to a base.

BACKGROUND OF THE INVENTION

A wire E.D.M. is used by manufacturers to make precision cuts in work pieces. To provide optimal cutting results, it is necessary to secure firmly and orient each work piece being cut. Various clamping systems are used in precision machinery to releasably secure and orient a work piece.

Typically, the clamping systems include a leveling head having a clamping portion for securing a work piece and a base portion for securing the clamping device to a support surface. The clamping device is fastened directly to a machine tool support surface and the leveling head directly contacts the support surface.

A problem with these systems is that laying the leveling head directly on the machine support surface causes excessive wear to the surface. For example, placing and removing the leveling head on and from an E.D.M. table, made of soft stainless steel, often causes scratches and divots, or otherwise damages the table. Since a damaged table can lead to imprecision, even damage appearing minor can nonetheless generate the need to replace the support surface.

Another problem with the leveling head being mounted directly on the support surface of a machine tool is that a limited number of directional adjustments can be made to the device. Further, it is inconvenient to attach and remove the clamping device from the machine tool as an Allen wrench or other tool is usually required to attach a releasing lever before the device can be removed. Yet another problem is that the systems are expensive and so bulky that the machine tool does not have the capacity to accommodate a stack of clamping devices to provide additional clamping support.

What is needed, then, is a clamping fixture that includes a work piece holder that does not contact the support surface of a workstation. A fixture that is more affordable to manufacturers and that can be stacked one atop another is also needed. Further, it is desirable to have a fixture that can easily be finely adjusted, wherein the work piece holder includes clamping jaws that can be quickly interchanged. Thus, it is an object of the invention to provide an improved clamping fixture.

SUMMARY OF THE INVENTION

A clamping fixture for securing a work piece to a support surface at a machining workstation comprises a base and a work piece holder. Preferably, the base is attachable to the support surface and has at least one undercut edge. The work piece holder engages the undercut edge of the base and is adjustably spaced apart from the support surface. Moveable work piece attaching jaws can be attached to the work piece holder. A foot, having an edge engaging the undercut edge of the base, may be coupled to the work piece holder. Additionally, the foot may be coupled to a spring biased lever that is hingedly mounted to the work piece holder. The foot can engage or disengage the undercut edge of the base via the lever without the need for additional tools.

According to an aspect of the invention, the work piece holder includes a first adjustable spacer assembly, and first and second jaw assemblies engaging the base. The first adjustable spacer assembly includes a spacer disposed between the work piece holder and the base for locally adjusting the spacing therebetween, a first head, a first threaded portion and a second threaded portion. The first head is coupled to the first threaded portion and the first adjustable spacer is coupled to the second threaded portion. The first threaded portion and the second threaded portion are each threaded in the same direction and preferably have different pitches. When the first adjustable spacer travels along the second threaded portion, the work piece holder is adjustable along an incline relative to the base. The first and second base-engaging jaw assemblies each include a base-engaging jaw disposed between the work piece holder and the undercut edge for locally adjusting the spacing between the work piece holder and the base. Each base-engaging jaw assembly also includes a first head, a first threaded portion and a second threaded portion. The first head of each assembly is coupled to the first threaded portion of each assembly and the base-engaging jaw of each assembly is coupled to the second threaded portion of each assembly wherein the first threaded portion and the second threaded portion are each threaded in the same direction and preferably have different pitches. When the first base-engaging jaw travels along the second threaded portion of the first base-engaging jaw assembly, the work piece holder is adjustable along an incline relative to the base. When the second base-engaging jaw travels along the second threaded portion of the second base-engaging jaw assembly, the work piece holder is horizontally translated relative to the base. Thus, the work piece holder can be easily adjusted relative to the base at multiple angles.

In another aspect of the invention, the fixture is stackable and comprises a first work piece holder disposed along the support surface, and two spaced apart support plates juxtaposed to the first work piece holder. A first base having at least one undercut edge is coupled to the first and second support plates. A second work piece holder can then be stacked atop the first work piece holder by engaging the at least one undercut edge of the first base. Thus, the second work piece holder is spaced apart from the first work piece holder.

A general object of the invention is to provide a fixture having a work piece holder that does not lie directly on a support surface.

Another object of the invention is to provide a fixture that allows the fixture to be finely adjusted at various angles.

Further, an object of the invention is to provide a fixture that can be stacked one atop the other.

Yet, another object of the invention is to provide a fixture which has attachments that can be interchanged quickly.

These and various other objects, features and advantages that characterize the present invention will be apparent upon reading of the following detailed description and review of the accompanying drawings.

BRIEF DESCRIPTION OF THE DRAWING FIGURES

DETAILED DESCRIPTION OF THE INVENTION

Figure 1:
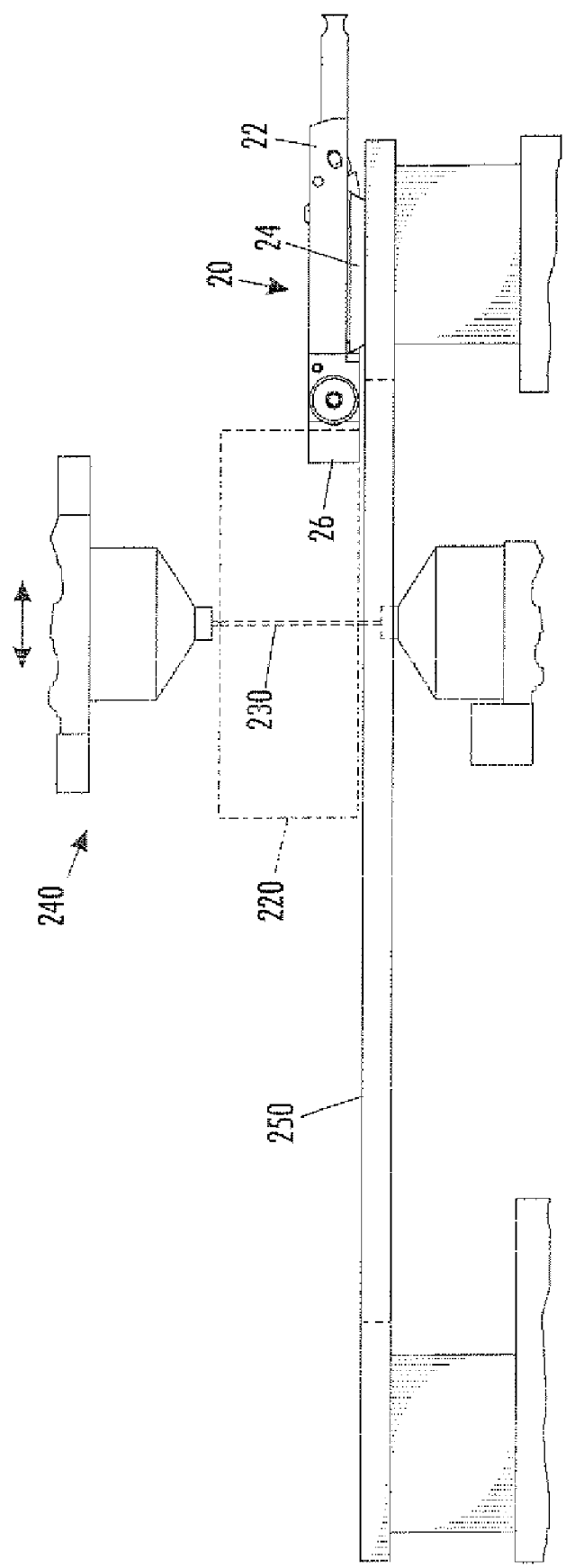
FIG. 1 is a side view of a fixture according to a presently preferred embodiment of the invention showing the fixture clamping a work piece being cut by a wire electrical discharge machine.

Referring to the Figures, FIG. 1 is a side view of an embodiment of the present invention showing a fixture 20 holding a work piece 220 being cut by a wire 230 of a machining workstation 240 such as an E.D.M tool. The fixture 20 includes a work piece holder 22 that engages a base 24 attachable to a support surface 250, such as a wire E.D.M table surface. As shown in the figure, the work piece 220 can be held by moveable work piece attaching jaws 26 such as a clamp.

Figure 2:
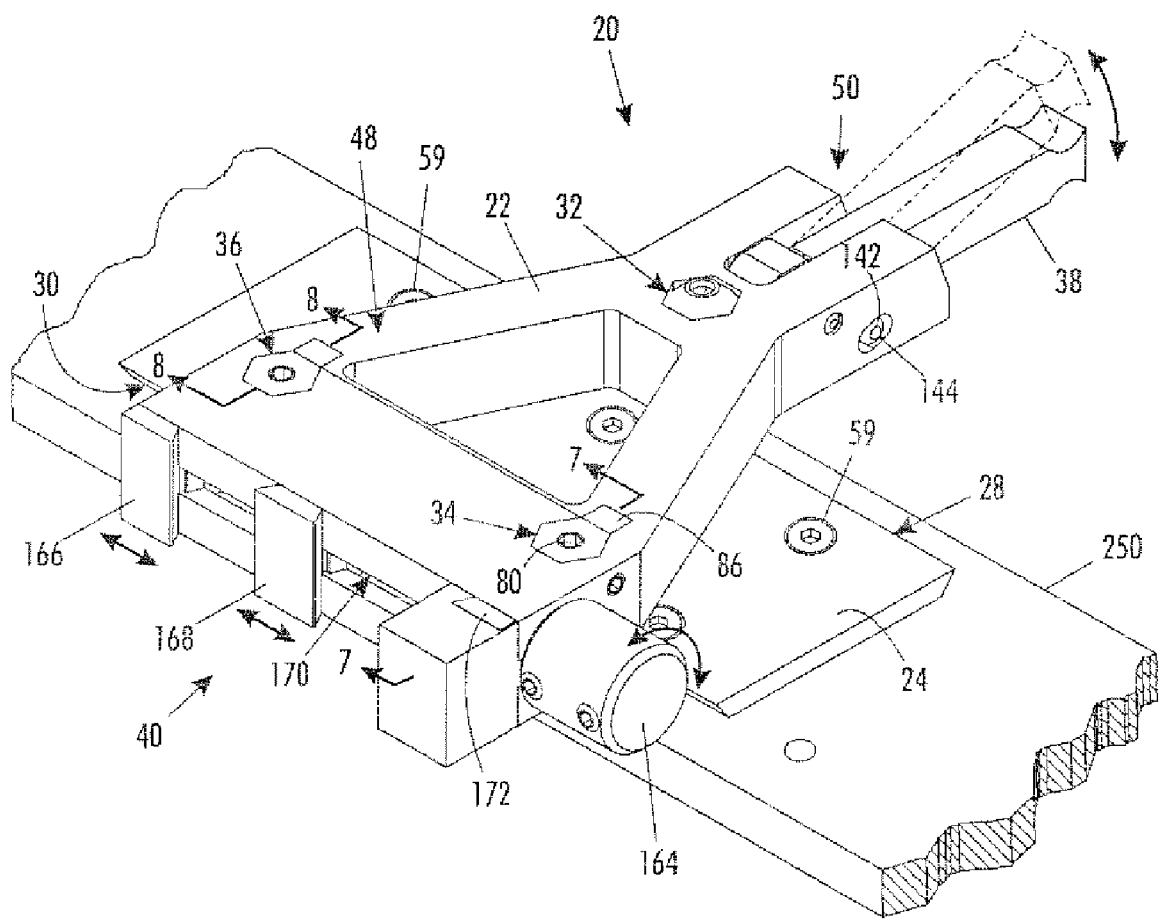
FIG. 2 is a perspective view of the fixture according to a presently preferred embodiment of the invention showing a work piece holder and a base mounted to a support surface.
Figure 3:
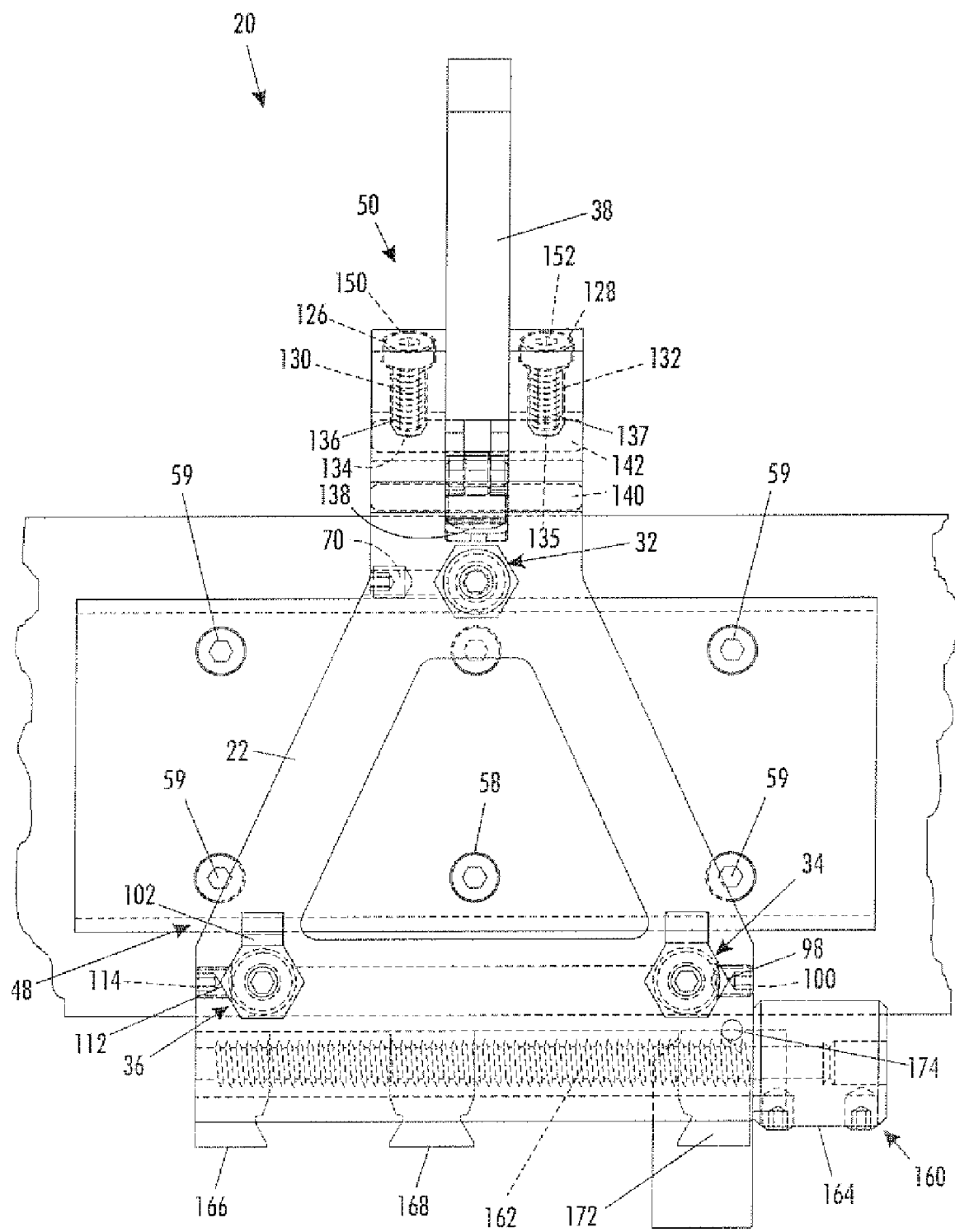
FIG. 3 is a top view of the fixture according to a presently preferred embodiment of the invention wherein internal parts of the work piece holder are shown in phantom.
Figure 4:
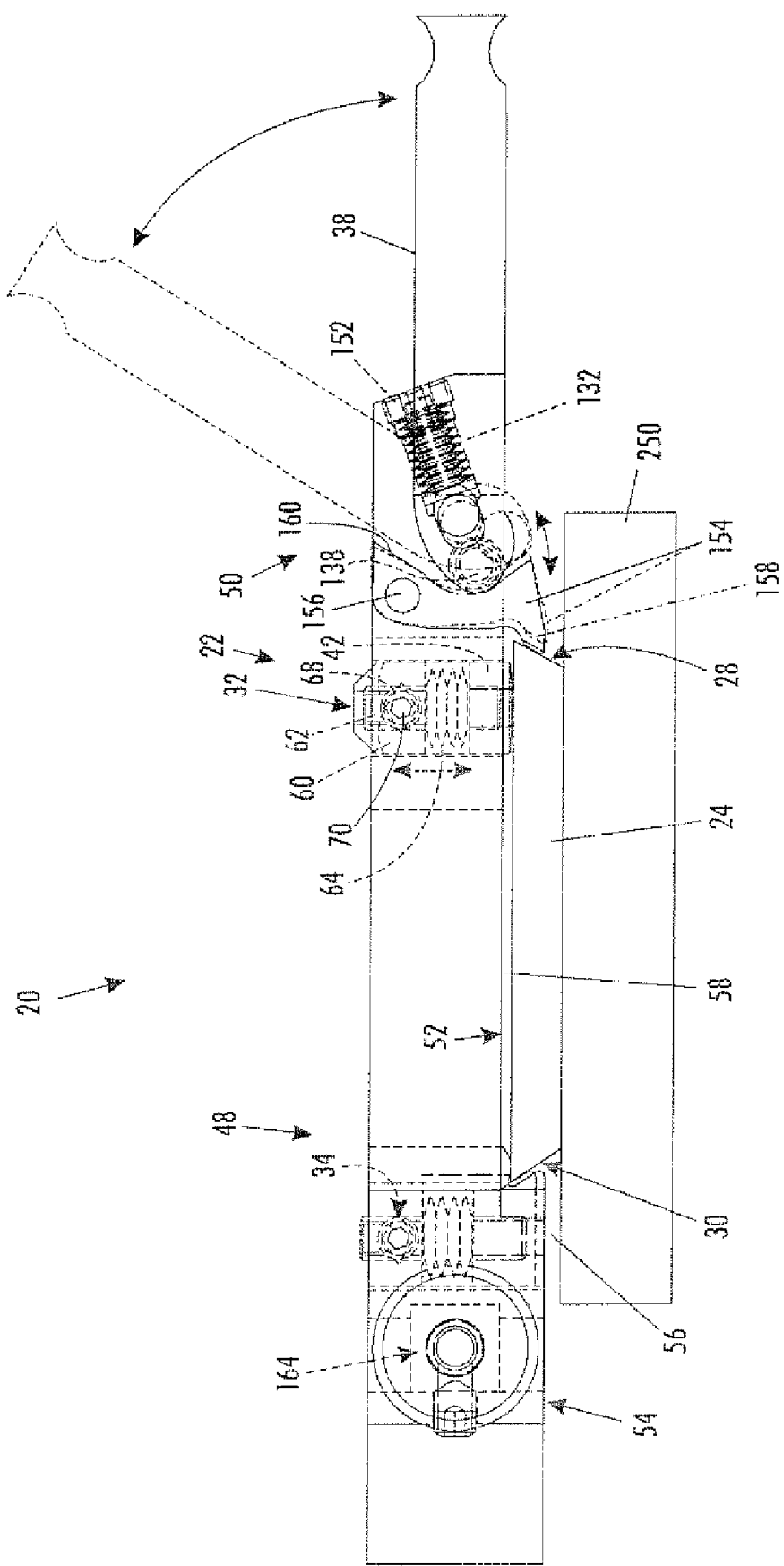
FIG. 4 is a side view of the fixture according to a presently preferred embodiment of the invention, wherein the internal parts of the work piece holder are shown in phantom.
Figure 7:
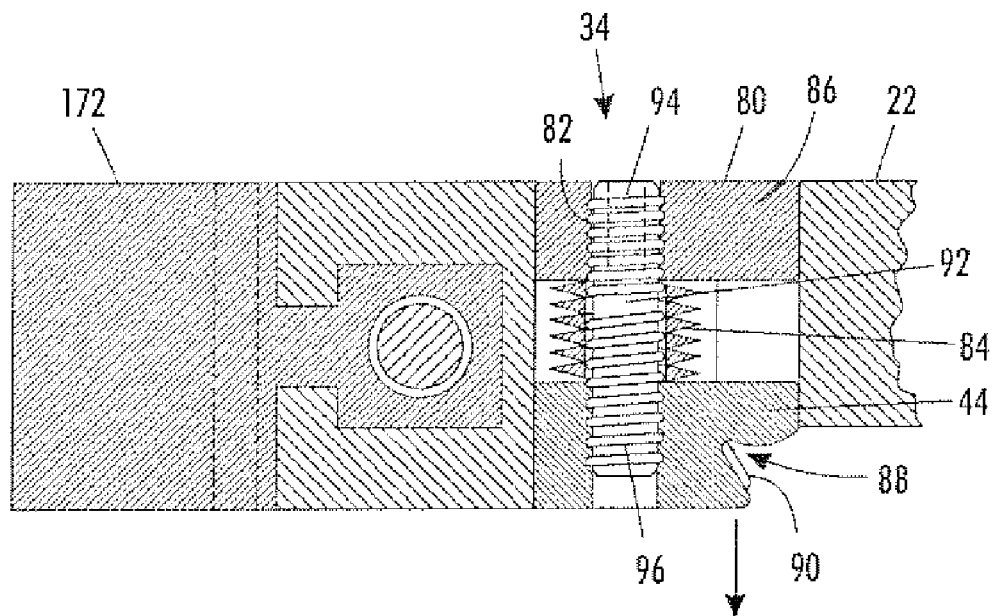
FIG. 7 is a cross-sectional view of a first base-engaging jaw assembly of the fixture according to a presently preferred embodiment of the invention taken generally along line 7-7 in FIG. 2.
Figure 8:
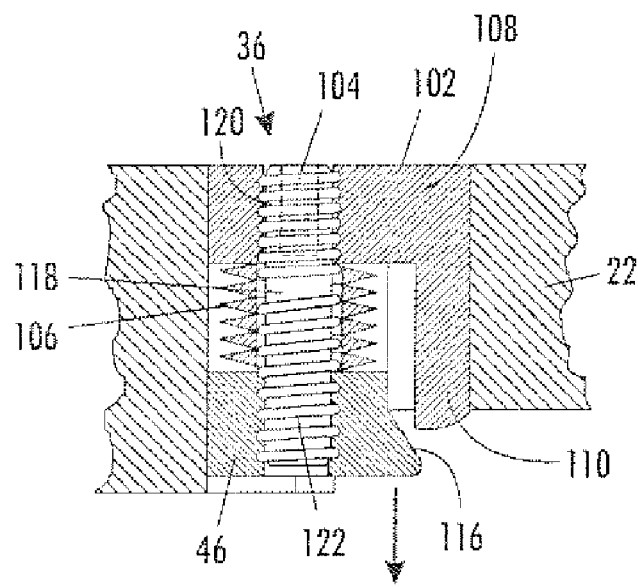
FIG. 8 is a cross-sectional view of a second base-engaging jaw assembly of the fixture according to a presently preferred embodiment of the invention taken generally along line 8-8 in FIG. 2.

FIGS. 2, 3 and 4 are additional views of the work piece holder 22 engaging undercut portions 28, 30 of the base 24 The work piece holder 22 includes an adjustable spacer assembly 32, two base-engaging jaw assemblies 34, 36 a release lever 38 and a work piece clamping region 40. The adjustable spacer assembly 32 includes a spacer 42 and the two base-engaging jaw assemblies 34, 36 include a first base-engaging jaw 44 and a second jaw 46 as shown in FIGS. 7 and 8 and as discussed in more detail infra. The two base-engaging jaw assemblies 34, 36 are disposed along a front portion 48 of the work piece holder 22 and the adjustable spacer assembly 32 is disposed along a back portion 50 of the work piece holder 22. The bottom of the work piece holder 22 includes a recessed area 52 arranged to receive the base 24 and accommodate the jaws 44, 46 and a non-recessed area 54 that extends below the undercut edge 30, providing a small gap 56 between the bottom surface of the work piece holder 22 and the support surface 250. Because the work piece holder 22 is spaced apart from the support surface 250 forming the gap 56, the work piece holder 22 does not scrape the surface of the support surface 250, Also, having the work piece holder 22 disposed above the support surface 250 allows the position of the work piece holder 22 to be adjusted in substantially any direction and at substantially any angle. The adjustable spacer assembly 32 moves the work piece holder 22 along a vertical incline to adjust the angle of the work piece holder 22 and a space 58 disposed between the work piece holder 22 and the base 24. The first base-engaging jaw assembly 34 moves the work piece holder 22 along a vertical incline to adjust the angle of the work piece holder 22 and the space 58. A second base-engaging jaw assembly 36 horizontally translates the work piece holder 22 to additionally adjust the angle of the work piece holder 22.

The undercut portions 28, 30 may be beveled, T-cut or rounded edges and these modifications are intended to be within the spirit and scope of the invention as claimed. Further, the base 24 may be circular and comprise only one undercut edge that the holder 22 engages at angularly spaced apart locations As shown in the figures, the undercut edges 28, 30 may form acute angles with respect to the support surface 250. In a preferred embodiment, the beveled edges 28, 30 of the base 24 have an angle of about 30°. The base 24 may include apertures and may be coupled to the support surface 250 by a fastener 59 being inserted therein, such as bolts, screws, rivets, nails, snap fits, etc. A removable fastener is generally preferred.

Figure 5:
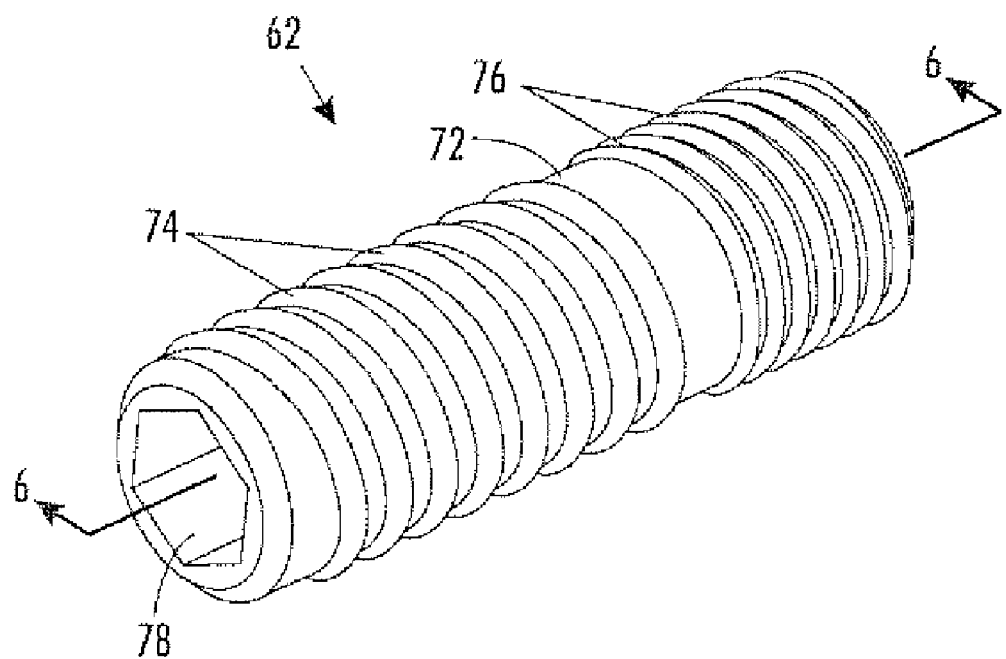
FIG. 5 is a perspective view of a threaded shaft of an adjustable spacer assembly of the fixture according to a presently preferred embodiment of the invention.
Figure 6:
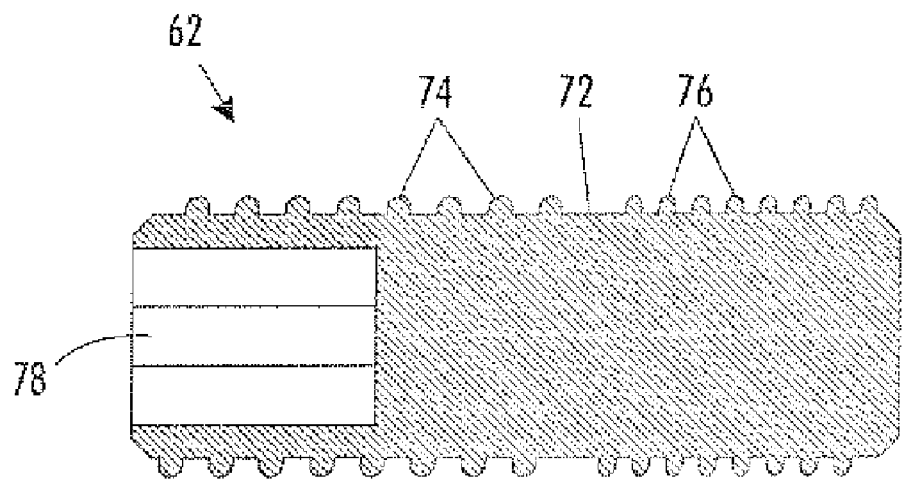
FIG. 6 is a cross-sectional view of the threaded shaft of the adjustable spacer assembly of the fixture according to a presently preferred embodiment of the invention taken generally along line 6-6 in FIG. 5.

The adjustable spacer assembly 32 comprises the first spacer 42, a head 60, a threaded shaft 62, and Belleville springs 64, wherein the adjustable spacer assembly 32 is pre-assembled and then disposed in a work piece holder receiving aperture (not shown). More specifically, the head 60 is a dome shaped hex nut having an internal threaded portion of a first predetermined pitch. The hex nut includes a side groove 68 for receiving a locking screw 70. The spacer 42 is a hex nut having a substantially flat bottom and an internal threaded portion of a second predetermined pitch, different from the pitch of the head 60. The spacer 42, which may have an internal threaded portion of ¼-28 UNF, Class 1B, and the head 60, which may have an internal threaded portion of ¼-20 UNC are coupled to the threaded shaft 62. As shown in FIGS. 5 and 6, the shaft 62 includes a non-threaded portion 72, a first threaded portion 74 and a second threaded portion 76 wherein each threaded portion 74, 76 has a predetermined pitch corresponding to the threaded pitch of the spacer 42 and the head 60. That is, the first threaded portion 74 of the threaded shaft 62 has a screw thread of ¼-20 UNC, Class 1A which corresponds to the threaded portion of the head 60. The second threaded portion 76 of the threaded shaft 62 has a screw thread of ¼-28 UNF, Class 1A which corresponds to the threaded portion of the spacer 42. Both threaded portions 74, 76 are threaded in the same direction providing a total net pitch of 70. In a preferred embodiment, the threaded shaft 62 is 0.79 inches long and the lengths of the first threaded portion 74, the non-threaded portion 72 and the second threaded portion 76 are 0.45 inches, 0.03 inches and 0.31 inches, respectively. It should be appreciated, however, that other threaded shaft lengths having similar ratios may be used. However, it is preferable that the ratio is such that the spacer 42 cannot be detached from the adjustable spacer assembly 32 when the assembly 32 is disposed in the work piece holder 22. That is, when the shaft 62 is rotated in a clockwise direction, the spacer 42 will move downward until the non-threaded portion 72 reaches the threads of the spacer 42. When the shaft 62 is rotated in a counter-clockwise direction, the spacer 42 will move upward until the non-threaded portion 72 reaches the threads of the head 60. In one configuration, the assembly 32 includes eight (8) Belleville springs 64 positioned between the head 60 and the spacer 42. More specifically, the springs 64 are stainless steel springs having the dimensions of 14 mm×7.2 mm×1.1 mm. The entire assembly 32 is compressed to 0.9 inches before loading the assembly 32 into the work piece holder 22.

As shown in FIG. 4, the groove 68 of the head 60 is v-shaped having a 90° angle. The groove 68 extends equidistant from two joining edges of the hexagon shaped nut wherein one edge is substantially planate with the flat bottom of the head 60. The screw 70 is inserted through an aperture (not shown) disposed on the side of the work piece holder 22. The screw 70 engages the groove 68, locking the head 60 into the work piece holder 22. Thus, the head 60 remains stationary in the work piece holder 22 having no rotational or translational movement. The spacer 42 is not locked into the work piece holder 22, but rather, vertically travels along the threaded shaft 62 when the threaded shaft 62 is rotated as discussed supra. It should be understood that the threaded shaft 62 includes an opening 78 for receiving an Allen wrench for finely adjusting the spacer 42. When the adjustable spacer assembly 32 is adjusted, the work piece holder 22 travels along a vertical incline relative to the base 24 which therefore, adjusts the space 58 between the work piece holder 22 and the base 24.

FIG. 7 shows the first base-engaging jaw assembly 34 which comprises the jaw 44, a head 80, a threaded shaft 82, and Belleville springs 84. The first base-engaging jaw assembly 34 is pre-assembled and then disposed in a second work piece holder aperture (not shown). The first jaw 44 moves the work piece holder 22 along a vertical incline. More specifically, the head 80 of the first base-engaging jaw assembly 34 is a flat hexagonal shaped nut having an extender 86 along the one end of the head 80. The head 80 includes internal threaded portions having a predetermined pitch.

As can be seen in FIG. 4, the jaw 44 is disposed between the work piece holder 22 and the undercut edge 28, 30 of the base 24 for locally engaging a portion of the undercut edge 28, 30. The jaw 44 also can be a hex nut having a ramp-shaped portion 88 extending from one end of the hex nut. However, as shown in FIG. 7, the ramp-shaped portion 88 includes a notch 90 for receiving the undercut edge 28, 30 of the base. It should be appreciated that the extender 86 of the head 80 and the ramp-shaped portion 88 of the jaw 44 are aligned during the pre-configuration of the assembly 34.

The jaw 44 also includes an internal threaded portion having a predetermined pitch different from the pitch of the head 80. In a preferred embodiment, the internal threaded portion of the jaw 44 is ¼-20 UNC, Class 1B and the internal threaded portion of the head 80 is ¼-28 UNF. The head 80 and the jaw 44 are coupled to the threaded shaft 82 which includes a non-threaded portion 92, a first threaded portion 94 and a second threaded portion 96. The threaded shaft 82 is not shown in cross-section so that the non-threaded portion 92 can be illustrated. Each threaded portion 94, 96 has a predetermined pitch corresponding to the threaded pitch of the jaw 44 and the head 80. That is, the first threaded portion 94 of the threaded shaft 82 has a screw thread of ¼-28 UNF, Class 1A which corresponds to the threaded portion of the head 80. The second threaded portion 96 of the threaded shaft 82 has a screw thread of ¼-20 UNC, Class 1A which corresponds to the threaded portion of the jaw 44. In a preferred embodiment, the total length of the threaded shaft 82 is 0.90 inches and the lengths of the first portion, the non-threaded portion and the second portion are 0.45 inches, 0.05 inches and 0.40 inches, respectively. It should be appreciated, however, that other threaded shaft lengths having similar ratios of about 2.25: 0.25:2.0 may be used. The first and second threaded portions 94, 96 are threaded in the same direction.

In one configuration, the first base-engaging jaw assembly 34 includes eight (8) Belleville springs 84 More specifically, the springs 84 are stainless steel springs having the dimensions of 14 mm×7.2 mm×1.1 mm. The entire assembly 34 is compressed to 1.0 inch before loading the assembly 34 into the work piece holder 22.

The head 80 also includes a side groove 98 as shown in FIG. 3 for receiving a locking screw 100 as described in more detail supra. Since the first jaw 44 is not locked into the work piece holder 22, the first jaw 44 travels vertically along the second portion 96 of the threaded shaft 82 when the threaded shaft 82 is rotated, thereby allowing for fine adjustments of the work piece holder 22 relative to the base. That is, when the threaded shaft 82 is rotated in a clockwise direction, the first jaw 44 will move upward until the non threaded portion 92 reaches the threads of the first jaw 44. By adjusting the position of the jaw 44, the space 58 between the work piece holder 22 and the base 24 is increased and decreased.

As shown in FIG. 8, the second base-engaging jaw assembly 36 comprises the second jaw 46, a head 102, a threaded shaft 104, and Belleville springs 106 wherein the second base-engaging jaw assembly 36 is pre-assembled before being disposed in a work piece holder receiving aperture (not shown) and horizontally translates the work piece holder 22. The head 102 of the second base-engaging jaw assembly 36 also includes a flat hexagonal shaped nut having an extender 108 along one end of the head 102. The extender 108 further includes a perpendicular arm 110 for contacting the surface of the base 24 (shown in FIG. 3). The head 102 has internal threaded portions having a predetermined pitch and a side groove 112 for receiving a locking screw 1 14, as shown in FIG. 3. The second jaw 46 is disposed between the work piece holder 22 and the undercut edges 28, 30 of the base 24 and is spaced apart from the first base-engaging jaw 34 for locally engaging a portion of the undercut edges 28, 30.

The second jaw 46 also can be a hex nut having a small ramp-shaped portion 116 extending from one end of the head 102. The second jaw 46 also includes an internal threaded portion having a predetermined pitch different from the pitch of the head 102 similar to that described supra for the first jaw 44. In a preferred embodiment, the internal threaded portion of the second jaw 46 is ¼-20 UNC, Class 1B and the internal threaded portion of the head 102 is ¼-28 UNF. The head 102 and the second jaw 46 are coupled to the threaded shaft 104 having a non-threaded portion 118, a first threaded portion 120 and a second threaded portion 122 wherein each threaded portion 120, 122 has a predetermined pitch corresponding to the threaded pitch of the head 102 and second jaw 46, respectively, as described supra for the first jaw 44. The threaded shaft 104 is not shown in cross-section so that the non-threaded portion 118 can be illustrated.

When the assembly 36 is inserted into the work piece holder 22 via a receiving aperture (not shown), the head 102 remains stationary in the work piece holder 22 via the locking screw 114 which engages the groove 112. The second jaw 46 is not locked into the work piece holder 22 but rather, travels along the second threaded portion 122 of the threaded shaft 104 when the threaded shaft 104 is rotated, allowing for fine adjustments of the work piece holder's 22 position relative to the base 24. That is, when the threaded shaft 104 is rotated in a clockwise direction, the second jaw 46 will move upwardly causing the small protruding portion 116 to exert a force on the base 24 thereby horizontally translating the work piece holder 22, As shown in the figures, the spacer assembly 32 and first and second jaw assemblies 34, 36, having compressed Belleville springs 64, 84 and 106, which provide zero backlash because the several Bellville springs 64, 84 and 106 push against the head 60, 80 and 102 and spacer 42 or one of the jaws 44, 46 with a force of 175 lbs. Thus, fine adjustments of 0.001 inches or less can easily be made to adjust the space 58 between the work piece holder 22 and the base 24.

In one configuration, the work piece holder 22 has a front portion 48 that is substantially triangularly shaped and a back portion 50. The back portion 50 further includes two threaded apertures 126, 128 for receiving Bellville spring assemblies 130, 132. In one configuration, the Bellville spring assemblies comprise pins 134, 135 and Bellville springs 136, 137 each having twenty (20) springs and the dimensions of 8 mm×4.2 mm×0.6 mm. The back portion 50 further includes the release lever 38. As shown in FIG. 3, the release lever 38 is pivotally connected to the back portion 50 by a roller 138 and a hinge pin 140. An additional pin 142 is secured through an elongated opening 144 in the work piece holder 22 through apertures (not shown) on the lever 38 to engage the Belleville spring sets 136, 137. Caps 150, 152 retain the Belleville spring assemblies 130, 132 within the work piece holder 22.

As shown in FIG. 4, a foot 154 secures the back portion 50 of the work piece holder 22 to the base 24. The foot 154 is hingedly secured to the work piece holder 22 via a hinge 156 and can include an edge 158 which may be coupled to the undercut edge 28 of the base 24. When the release lever 38 is in a first position it engages the foot 154 with the base 24. When the release lever 38 is in a second position, it disengages the foot 154 from the base 24. That is, the foot 154 engages the undercut edge 28 of the base 24 until the lever 38 is moved upwardly towards a vertical position. When the lever 38 becomes aligned with a top portion 160 of the foot 154, an additional force is required to overcome the spring bias force of the Belleville springs 130, 132. Applying such force compresses the Belleville springs 130, 132 thereby allowing the lever 38 to move slightly forward, releasing the foot 154 from the undercut edge 28. Although the release lever 38 is disclosed, it should be appreciated that any type of fixed edge engaging element can be used.

The work piece holder 22 also includes a rotating clamp adjustor 160 having a threaded rod 162 and a knurled nut 164 which translates a clamping means for holding a work piece 220. In one configuration, clamping means include a first member 166 coupled to the threaded rod 162, a second member 168 slideably disposed within an opening 170 of the clamping region 40 and a third member 172 removeably secured to the opening 170. The threaded rod 162 has a screw thread of 5/16-24 UNF, Class 1A and the first member 166 includes a screw thread of 5/16-24 UNF, Class 1B, wherein the first member 166 is coupled to the threaded rod 162. Thus, rotating the knurled nut 164 in a clockwise direction rotates the threaded rod 162 causing the first member 166 to travel along the opening 170. The third member 172 slides into place hitting a pin stop 174 in the work piece holder 22. The jaws may be interchanged with other types and sizes of jaw holders or vises. For example, flat jaws, dovetail clamps, or other types of vises may be used. Further, although three members are shown, it should be appreciated that fewer members or additional members may be used depending on the desired use.

Figure 9:
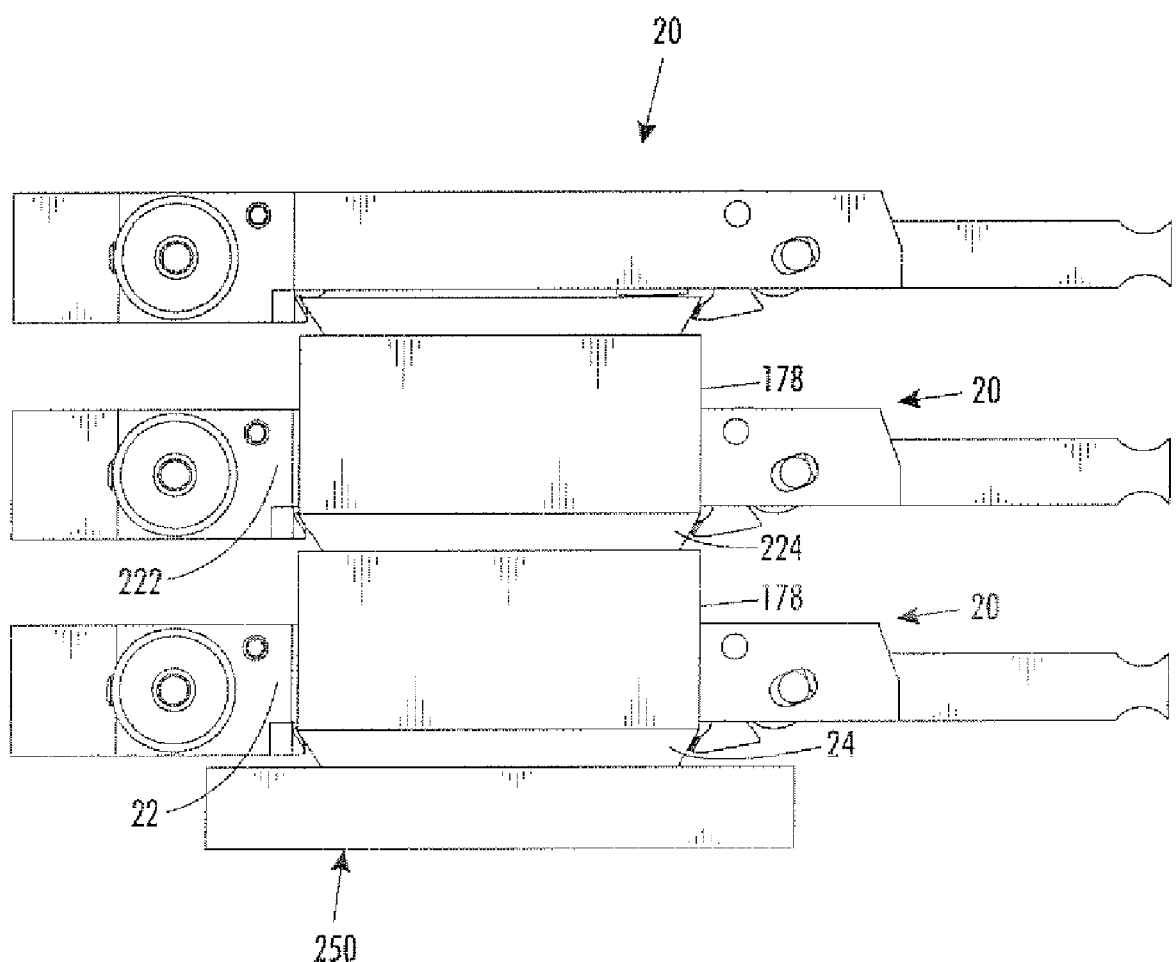
FIG. 9 is a partial cross-sectional view of multiple fixtures stacked one atop the other according to a presently preferred embodiment of the invention.

FIG. 9 is a partial cross-sectional view of the present invention showing multiple fixtures 20 stacked one atop another. The fixtures 20 and bases 24 can be aligned vertically to secure one or more work pieces 220 to the support surface 250 of the machining workstation 240. The stacked fixtures 20 each include a base 24 and a work piece holder 22. The first base 24 is attached to the support surface 250 of the machining workstation 240. A first work piece holder 22 engages the base 24 as described supra. Two support plates 178 (the second support plate is not shown) are perpendicularly coupled to two opposed top portions of the perimeter of the base 24. Then, a second base 224 is attached to the first work piece holder 22 and a second work piece holder 222 is secured thereto. At least one fastener (not shown) secures each support plate 178 to each base 24, 224. Although three fixtures 20 are shown stacked one atop another, additional or fewer fixtures 20 can be stacked together.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

The invention claimed is:

1. A fixture for securing a work piece to a support surface at a machine work station comprising:
a base attachable to the support surface and having at least one undercut edge;
a work piece holder engaging the at least one other cut edge of the base, spaced apart from the support surface, having moveable work piece attaching jaws and a relievable edge engaging latch comprising a releasable lever; and
a foot coupled to a second portion of the at least one undercut edge of the base, wherein the foot is engaged when the releasable lever is in a first position and wherein the foot is disengaged when the releasable lever is in a second position.

2. The fixture of claim 1 further comprising a first engaging jaw disposed between the work piece holder and the at least one undercut edge for locally adjusting the spacing between the work piece holder and the base.

3. The fixture of claim 2 further comprising a second engaging jaw disposed between the work piece holder and the at least one undercut edge, spaced apart from the first engaging jaw, for locally adjusting the spacing between the work piece holder and the base.

4. The fixture of claim 1 wherein the work piece holder further comprises:
a first spacer disposed between the work piece holder and the base for locally adjusting the spacing between the work piece holder and the base; and
a first spacer assembly having a first head, a first threaded portion, a second threaded portion and the first adjustable spacer, wherein the first head is coupled to the first threaded portion and the first adjustable spacer is coupled to the second threaded portion, and wherein the first threaded portion and the second threaded portion are each threaded in the same direction.

5. The fixture of claim 4 wherein the work piece holder is adjustable along an incline relative to the base when the first adjustable spacer travels along the second threaded portion.

6. The fixture of claim 1 wherein the work piece holder further comprises:
a first engaging jaw disposed between the work piece holder and the at least one undercut edge for locally engaging a first portion of the at least one undercut edge; and
a first engaging jaw assembly having a first head, a first threaded portion, a second threaded portion and the first engaging jaw, wherein the first head is coupled to the first threaded portion and the first engaging jaw is coupled to the second threaded portion, and wherein the first threaded portion and the second threaded portion are each threaded in the same direction.

7. The fixture of claim 6 further comprising a second engaging jaw disposed between the work piece holder and the at least one undercut edge, spaced apart from the first engaging jaw, for locally engaging a portion of the at least one undercut edge.

8. The fixture of claim 7 wherein the work piece holder further comprises a front portion and a back portion, the first and second engaging jaws are disposed along the front portion of the work piece holder and the first adjustable spacer is disposed along the back portion of the work piece holder.

9. The fixture of claim 6 wherein the work piece holder is adjustable along an incline relative to the base when the first engaging jaw travels along the second threaded portion.

10. The fixture of claim 6 wherein the work piece holder further includes:
   a second engaging jaw disposed between the work piece holder and the at least one undercut edge, spaced apart from the first engaging jaw, for locally engaging a portion of the at least one undercut edge; and
   a second engaging jaw assembly having a first head, a first threaded portion, a second threaded portion and the second engaging jaw, wherein the first head is coupled to the first threaded portion and the second engaging jaw is coupled to the second threaded portion, and wherein the first threaded portion and the second threaded portion are each threaded in the same direction.

11. The fixture of claim 10 wherein the work piece holder is adjustable relative to the base when the second engaging jaw travels along the second threaded portion.

12. The fixture of claim 11 wherein the work piece holder is horizontally translated when the second engaging jaw travels along the second threaded portion.

13. The fixture of claim 1 wherein the at least one undercut edge is a beveled edge.

14. The fixture of claim 1 wherein the at least one undercut edge is a T-cut edge.

15. The fixture of claim 1 wherein the at least one undercut edge is a rounded edge.

16. A fixture for securing a work piece to a support surface at a machining workstation comprising:
   a base attachable to the support surface and having at least one undercut edge;
   a work piece holder engaging the at least one undercut edge of the base, spaced apart from the support surface, and having moveable work piece attaching jaws;
   a foot coupled to the work piece holder and having an edge engaging the at least one undercut edge of the base;
   a spring biased lever hingedly mounted to the work piece holder and arranged to engage the foot, wherein the work piece holder further includes an elongated opening and a pivot pin, wherein the elongated opening and the spring biased lever are arranged to receive the pivot pin;
   at least two Belleville spring sets disposed within the work piece holder and coupled to the spring biased lever;
   a first adjustable spacer disposed between the work piece holder and the base for locally adjusting the spacing therebetween;
   a first spacer assembly having a first head, a first threaded portion, a second threaded portion and the first adjustable spacer, wherein the first head is coupled to the first threaded portion and the first adjustable spacer is coupled to the second threaded portion, wherein the first threaded portion and the second threaded portion are each threaded in the same direction, and wherein the work piece holder is adjustable along an incline relative to the base when the first adjustable spacer travels along the second threaded portion;
   a first engaging jaw disposed between the work piece holder and the at least one undercut edge of the base for locally adjusting the spacing between the work piece holder and the base;
   a first engaging jaw assembly having a first head, a first threaded portion, a second threaded portion and the first engaging jaw, wherein the first head is coupled to the first threaded portion and the first engaging jaw is coupled to the second threaded portion, wherein the first threaded portion and the second threaded portion are each threaded in the same direction, and wherein the work piece holder is adjustable along an incline relative to the base when the first engaging jaw travels along the second threaded portion;
   a second engaging jaw disposed between the work piece holder and the at least one undercut edge for locally adjusting the spacing between the work piece holder and the base; and
   a second engaging jaw assembly having a first head, a first threaded portion, a second threaded portion and the second engaging jaw, wherein the first head is coupled to the first threaded portion and the second engaging jaw is coupled to the second threaded portion, wherein the first threaded portion and the second threaded portion are each threaded in the same direction, and wherein the work piece holder is horizontally translated relative to the base when the second engaging jaw travels along the second threaded portion.

17. A stackable fixture for securing a work piece to a support surface at a machining workstation comprising:
   a first work piece holder disposed along the support surface and having moveable work piece attaching jaws;
   a first support plate juxtaposed to the first work piece holder;
   a second support plate spaced apart from the first support plate and juxtaposed to the first work piece holder;
   a first base coupled to the first and second support plates and having at least one undercut edge;
   a second work piece holder spaced apart from the first work piece holder and engaging the at least one undercut edge of the first base; and
   a second base having at least one undercut edge, a third work piece holder and spaced apart third and fourth support plates juxtaposed to the second work piece holder, wherein the second base is coupled to the spaced apart third and fourth support plates and the third work piece holder engages the at least one undercut edge of the second base.

* * * * *